US010891717B2

(12) United States Patent
Mody et al.

(10) Patent No.: US 10,891,717 B2
(45) Date of Patent: *Jan. 12, 2021

(54) ADAPTIVE BILATERAL (BL) FILTERING FOR COMPUTER VISION

(71) Applicant: TEXAS INSTRUMENTS INCORPORATED, Dallas, TX (US)

(72) Inventors: Mihir Narendra Mody, Karnataka (IN); Shashank Dabral, Allen, TX (US); Jesse Gregory Villarreal, Jr., Richardson, TX (US); William Wallace, Richardson, TX (US); Niraj Nandan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,200

(22) Filed: Nov. 1, 2018

(65) Prior Publication Data

US 2019/0130534 A1    May 2, 2019

Related U.S. Application Data

(63) Continuation of application No. 15/183,459, filed on Jun. 15, 2016, now Pat. No. 10,121,231.

(Continued)

(51) Int. Cl.
*G06K 9/00* (2006.01)
*G06T 5/00* (2006.01)
(Continued)

(52) U.S. Cl.
CPC ............ *G06T 5/002* (2013.01); *G06K 9/4647* (2013.01); *G06T 5/20* (2013.01); *G06T 2200/28* (2013.01);

(Continued)

(58) Field of Classification Search
CPC . G06T 5/20; G06T 5/002; G06T 2207/20028; G06T 2207/10028; G06T 2207/20024; G06K 9/40
See application file for complete search history.

(56) References Cited

U.S. PATENT DOCUMENTS

2005/0024353 A1    2/2005 Amundson
2005/0025378 A1    2/2005 Maurer
(Continued)

OTHER PUBLICATIONS

Anonymous: "Bilateral Filter", Retrieved from the Internet: URL:https://en.wikipedia.org/w/index.php?title=Bilateral_filer&oldid=688984230 [retrieved on Jan. 25, 2019], XP055547709, Nov. 4, 2015, pp. 1-4.

(Continued)

*Primary Examiner* — Li Liu
(74) *Attorney, Agent, or Firm* — Ronald O. Neerings; Charles A. Brill; Frank D. Cimino

(57) ABSTRACT

A method for filtering noise for imaging includes receiving an image frame having position and range data. A filter size divides the frame into filter windows for processing each of the filter windows. For the first pixel, a space to the center pixel and a range difference between this pixel and the center pixel is determined and used for choosing a selected weight from weights in a 2D weight LUT including weighting for space and range difference, a filtered range value is calculated by applying the selected 2D weight to the pixel, and the range, filtered range value and selected 2D weight are summed. The determining, choosing, calculating and summing are repeated for at least the second pixel. A total sum of contributions from the first and second pixel are divided by the sum of selected 2D weights to generate a final filtered range value for the center pixel.

26 Claims, 4 Drawing Sheets

Related U.S. Application Data

(60) Provisional application No. 62/289,706, filed on Feb. 1, 2016.

(51) Int. Cl.
*G06T 5/20* (2006.01)
*G06K 9/46* (2006.01)

(52) U.S. Cl.
CPC ............... *G06T 2207/20004* (2013.01); *G06T 2207/20021* (2013.01); *G06T 2207/20028* (2013.01)

(56) References Cited

U.S. PATENT DOCUMENTS

| | | | |
|---|---|---|---|
| 2005/0069201 A1* | 3/2005 | Speigle | ............... H04N 1/6077 382/167 |
| 2010/0046859 A1 | 2/2010 | Hitomi | |
| 2011/0200269 A1 | 8/2011 | Das Gupta et al. | |
| 2012/0195492 A1 | 8/2012 | Ali | |
| 2012/0260630 A1* | 10/2012 | Sujan | ..................... F02D 21/08 60/274 |
| 2013/0003832 A1 | 1/2013 | Li | |
| 2013/0321673 A1 | 12/2013 | Lim | |
| 2013/0322752 A1 | 12/2013 | Lim | |
| 2015/0030257 A1 | 1/2015 | Avadhanam | |
| 2016/0037059 A1 | 2/2016 | Lim | |
| 2017/0091917 A1 | 3/2017 | Bronstein | |

OTHER PUBLICATIONS

Lindner, Marvin, et al.: "Time-of-Flight Sensor Calibration for Accurate Range Sensing", Computer Vision and Image Understanding. Academic Press, US, vol. 114, No. 12, Dec. 1, 2010, pp. 1318-1328, XP027422946, ISSN: 1077-3142, DOI: 10.1016/J.CVIU. 2009.11.002 [retrieved on Aug. 21, 2010].

Ushizima, Daniela, et al.: "Statistical Segmentation and Porosity Quantification of 3D X-ray Micro-tomography", Proceeding of SPIE, Applications of Digital Image Processing, vol. 8135, Jan. 1, 2011, XP040565785, pp. 1-14.

Gunturk, Bahadir. "Fast bilateral filter with arbitrary range and domain kernels." Image Processing (ICI P), 2010 17th IEEE International Conference on. IEEE, 2010.

\* cited by examiner

ADAPTIVE BILATERAL (BL) FILTERING FOR COMPUTER VISION

CROSS REFERENCE TO RELATED APPLICATIONS

This application is a Continuation of application Ser. No. 15/183,459 filed Jun. 15, 2016 which claims the benefit of Provisional Application Ser. No. 62/289,706 entitled "MULTI-FUNCTION AND EFFICIENT ADAPTIVE BILATERAL (BL) FILTERING FOR ADAS SYSTEMS" filed on Feb. 1, 2016, which is herein incorporated by reference in its entirety.

FIELD

Disclosed embodiments relate to processing of digital images using bilateral filtering.

BACKGROUND

A popular technique for image processing is to apply a bilateral (BL) filter to an image. A BL filter is a filter which computes new values for pixels in an image based on the spatial closeness as well as the photometric similarity of neighboring pixels in the image.

BL filtering is becoming the de-facto noise filtering for computer vision systems, such as for Advanced Driver Assistance Systems (ADAS), due to its edge-preserving property. ADAS is implemented by an automotive vision control system which processes digital information from imaging sources including digital cameras, lasers, radar and other sensors to perform tasks such as lane departure warning, drowsiness sensors, and parking assistance. In such a vision control system a vision sensor may be embodied as a system-on-a-chip (SoC) that includes a BL filter for noise filtering that is coupled to a processor such as a digital signal processor (DSP) or other processor.

Conventional BL filtering uses a direct formula implementation in essentially real-time (on-the-fly) utilizing the known standard BL filter equation shown below, where p is the center pixel and q are the neighboring pixels.

$$BF[I]_p = 1/Wp \sum_{q \in S} G\sigma_s(\|p - q\|) \cdot G\sigma_r(|Ip - Iq|) I_q$$

where BF[I], is the filtered output, 1/Wp is the normalization factor, $G\sigma_s$ ($\|p-q\|$) is the space (i.e., distance) weight, $G\sigma_r$ ($|Ip-Iq|$) is the range (i.e., intensity) weight, and $I_q$ is the input pixel being filtered. The respective weights are each calculated as a product of two Gaussian functions. In 2-dimensions (x,y) an isotropic (i.e. circularly symmetric) Gaussian function has the following form:

$$G(x, y) = \frac{1}{2\pi\sigma^2} e^{-\frac{x^2+y^2}{2\sigma^2}}$$

where σ is the standard deviation (or variance) of the distribution.

To support multiple ranges and distances, a sigma (σ) calculation is performed, per the above direct formula, where a being the variance which defines the amount of blurring. To employ adaptive BL filtering, a complex content adaption using local a is generally used.

SUMMARY

This Summary briefly indicates the nature and substance of this Disclosure. It is submitted with the understanding that it will not be used to interpret or limit the scope or meaning of the claims.

Disclosed embodiments recognize known bilateral (BL) filtering implementations have a high computation complexity resulting in the need for a large semiconductor (e.g., silicon) area for circuit hardware (HW) filter implementations or a high central processing (CPU) loading for software (algorithm) filter implementations. This inefficiency is the result of a complex equation for generating the respective weights on-the-fly because as noted above the weight generating equation requires a computation involving the product of two Gaussian functions.

Disclosed embodiments include a method for filtering noise for imaging that comprises receiving an image frame comprising image data from a plurality of pixels having a position and a range (intensity) value including a plurality of window pixels. Based on a selected filter window size that divides the frame into a plurality of filter windows including a center pixel, and a plurality of other pixels (neighborhood pixels) including first pixel and at least a second pixel, the plurality of filter windows are processed. For the first pixel, a space being its distance to the center pixel and a range difference between the first pixel and the center pixel is determined, the space/range difference are used for choosing a combined 2D weight from pre-computed combined 2D weights stored in a 2D weight lookup table (LUT) including weighting for both space and a range difference, a filtered range value is calculated by applying the selected combined 2D weight to the first pixel, and then the range, filtered range value and selected 2D weight are then summed to determine the first pixel's contribution.

The determining, choosing, calculating and summing are then repeated for the second pixel, typically to complete these steps for all of the other (neighborhood) pixels in the filter window. A total sum of contributions from the first and the second pixel (and typically all of the other pixels in the filter widow) are divided by the sum of selected combined 2D weights from these pixels to generate a final filtered range value for the center pixel as a filtered output pixel. The method is generally repeated for all filter windows in the image frame to generate a noise filtered image that can be utilized for an Advanced Driver Assistance System (ADAS).

BRIEF DESCRIPTION OF THE DRAWINGS

Reference will now be made to the accompanying drawings, which are not necessarily drawn to scale, wherein.

DETAILED DESCRIPTION

Figure 1:
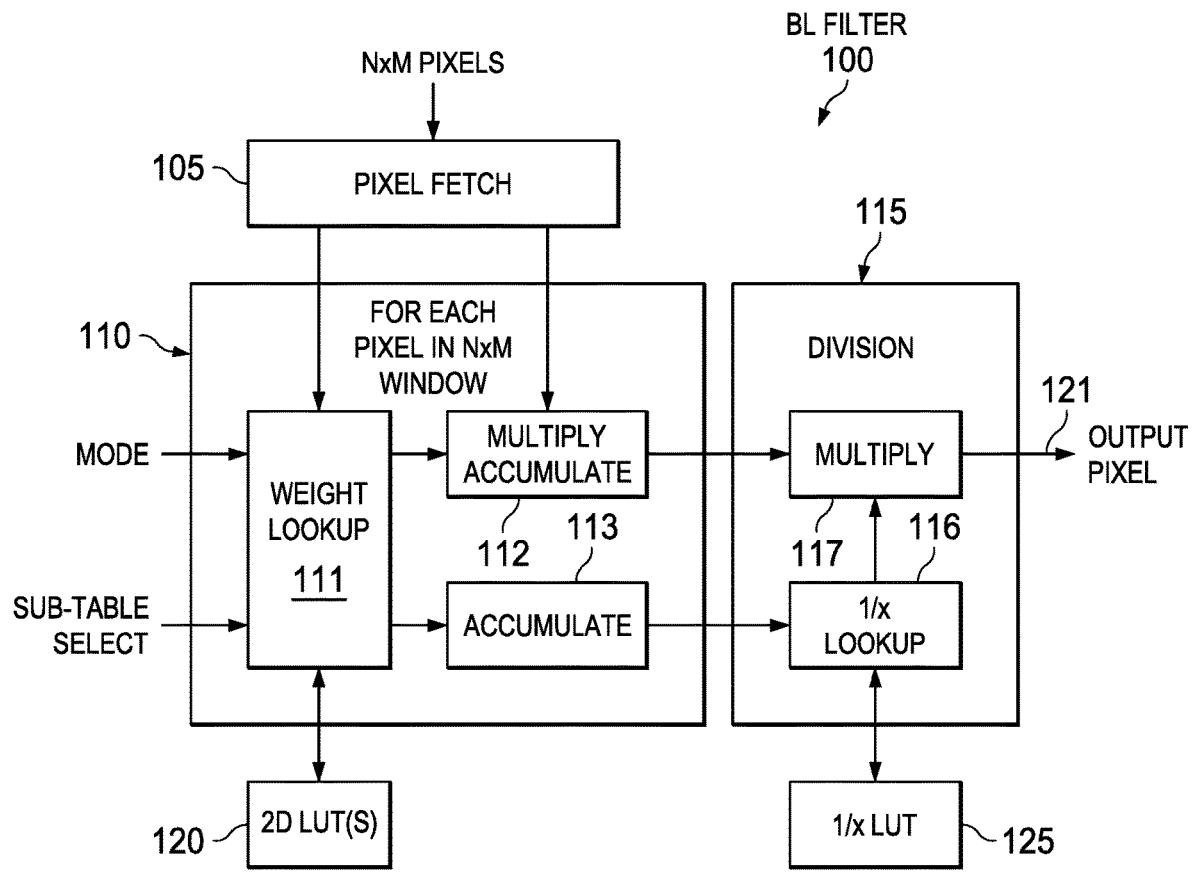
FIG. 1 is a block diagram representation of a pipeline for an example BL filter including at least one combined 2D weight LUT having a plurality of combined 2D weights, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Algorithm or hardware configuration details are now described for disclosed BL filters that utilize at least one combined 2D weight LUT (2D weight LUTs). In the direct BF filter equation (copied again below):

$$BF[I]_p = 1/Wp \sum_{q \in S} G\sigma_s(\|p-q\|) \cdot G\sigma_r(|Ip - Iq|) I_q$$

BF stands for BL filter, so that BF[I] is the BF filtered image output by the BL filter. Space refers to distance to the center pixel, and range refers to the amplitude/intensity of the light, p is center pixel, and q are the neighboring pixels. The first term in front of the summation 1/Wp is a normalization (or weighting) factor. The terms summed include a space (i.e., distance) weight ($G\sigma_r$ (|Ip–Iq|) term) multiplied by a range (i.e., intensity) weight ($G\sigma_r$ (|Ip–Iq|)) multiplied by Iq which is the input pixel being filtered. The space weight includes $G\sigma_r$ which is the spatial extent of the kernel being the size of the considered pixel neighborhood defined by the filter window, and the range weight includes $G\sigma_s$ which is the "minimum" amplitude of an edge.

Disclosed embodiments combine the space weight and range weight together to provide pre-computed combined 2D weights (W(i,j) (i corresponding to space and j corresponding to range) that are stored in one or more 2D weight LUT(s). As described in more detail below, the 2D weight values in the 2D weight LUT(s) can be optionally quantized to reduce the size (number of entries) of the LUT. Regarding generating combined 2D weights for disclosed 2D weight LUTs, combined 2D weights can be computed using the example equation below for each center pixel in the image based on an input (guide) image:

where i is the center pixel index, j is a neighborhood pixel index, $I_i$ is the center pixel input image range, and $I_j$ is the neighbor pixel input image range.

$$W_{i,j}^{bf} = \frac{1}{K_i} \underbrace{\exp\left(-\frac{|i-j|^2}{\sigma_s^2}\right) \exp\left(-\frac{|I_i - I_j|^2}{\sigma_c^2}\right)}_{\text{Division} \qquad \text{2D-Weight}},$$

Example implementation details are shown below: (i–j) is 3-bit for a 5×5 (pixel neighborhood for a 5×5 filter); (Ii–Ij) is 13-bits quantized to 8 bits; each 2D weight Wi,j is pre-computed as 8-bit values including normalization to put in a combined 2D weight LUT; LUT[i][j]: i is a 3 bit pixel index, and j is an 8 bit image range difference. The lookup value can be 8 bits and the total 2D LUT storage 5×256×8 bits=1,280 bytes that can be stored for example in a flip-flop based design. As described below, the 2d LUT size can be reduced further based on recognizing the symmetrical nature of the space and/or the range data. Although this example uses a pixel neighborhood of size 5×5, disclosed embodiments described herein can be extended to any filter window size, such as 4×4, 7×7, 9×9, 11×11, etc.

For the 1/Ki division in the equation above the LUT described below as a 1/x LUT 125 in FIG. 1 can be used, where the 1/Ki calculation can be performed using a reciprocal table. The following are specific non-limiting example details for a reciprocal table. The reciprocal table can be located in a read only memory (ROM) (i.e. all values hardwired) and there can be 24 bits per entry. The first 512 entries may not be quantized, with the remaining entries quantized by 16 with bilinear interpolation during lookup of two neighboring values, and there can be a total of 993 LUT entries.

FIG. 1 is a block diagram representation of a pipeline for an example BL filter 100 shown including one or more disclosed 2D weight LUT(s) 120 having a plurality of combined 2D weights (W(i,j), according to an example embodiment. As noted above, the BL filter 100 can be implemented as a hardware (HW) filter block or by a processor (e.g., central processing (CPU)) implementing disclosed software. The BL filter 100 reads image data originating from a scene (an input image (or frame) having a plurality of pixels) provided generally from a memory (e.g. double data rate synchronous dynamic random-access memory (DDR SDRAM or on-chip) to a shared memory (SL2) and performs disclosed bilateral (2D) filtering on each filter window (size N×M), such as 5×5) to generate a final filtered range value for each center pixel in the filter widows as a BL filter output pixel having reduced noise.

N×M window pixels defined by a selected filter window size are shown received by a pixel fetch block 105. The N×M window pixels received define a center pixel and N×M−1 or other pixels (or neighborhood pixels) that are around the center pixel shown as center pixel 215 in FIG. 2A. In the specific example shown in FIG. 2A, the filter window size is 5×5 so that the other (neighborhood) pixels besides the center pixel 215 total 24.

The block shown as block 110 is a pixel contribution calculation block that generally calculates a pixel contribution for each pixel in the N×M filter window by using the respective pixel's space (position) and range (intensity) data to select a combined 2D weight from the combined 2D weight LUT(s) 120. The weight lookup block 111 receives the N×M pixels. The 2D weight lookup indexing strategy employed by weight lookup block 111 is dependent on the space (position) of the respective pixel in the filter window relative to the center pixel, and the range difference of that pixel compared to the range of the center pixel.

The size of the 2D LUT 120 is dependent on the strategy to use a space lookup, and the amount of optional quantization (if any) of the pixel bit width. When the 2D weight LUT 120 comprises a plurality of sub-LUT tables, two different mutually exclusive sub-table selection techniques are disclosed as shown in FIG. 1. Each sub-LUT table has values derived from combining the range σ and space σ into a single (not separable) table. Even if one only varies the range σ (as opposed to both the range and space σ) when generating each sub-LUT table, the table still contains a space a for each sub-table. As a result, each parameter in the sub-table includes both a space and a range σ.

A first sub-table select technique termed herein adaptive mode control is shown controlled by the "mode" signal which is generally provided by a processor (not shown) applied to the weight lookup block 111 for selecting a particular sub-LUT table on a per-pixel basis. In this embodiment, the weight lookup block 111 averages the range of other pixels in each filter window to calculate a local average range for choosing the index for the selecting a particular sub-LUT.

A second sub-table select technique termed direct mapping to table ID is shown controlled by the "sub-table select" signal shown which is generally provided by a processor applied to the weight lookup block 111 for selecting a particular sub-LUT for pixel processing across an entire frame. In this embodiment, the weight lookup block 111 indexes into the sub-LUT specified by the "sub-table-select" signal. This embodiment allows for multiple sub-LUTs to be configured to different planes (i.e. luminance vs. chrominance) or different video streams (different camera sources) to be loaded into memory at once and selected using the sub-table-select signal on a per frame basis without the need to reload the LUT for each frame.

The sub-table-select corresponds to which sub-table the user wants to use for that particular frame that is being processed. Below is a few example specific example situations to describe this feature.

1. If one is processing a video which is comprised of 2 planes (luma plane and chroma plane), only one plane can generally go through the noise filter at a time. Luma and chroma planes have a different sub-sampling and noise characteristic, so they generally need different 2D LUT configurations. Without a disclosed sub-table-select signal, there would be a need to reprogram the 2D LUT in between processing data from each plane. For a video feed, that means 2 times per frame from the camera. Since reprogramming the 2D LUT takes a significant amount of time, it is better to use a configuration that program both of the 2D LUTs as 2 sub-LUT tables. This way, when one processes the luma plane, one simply programs the sub-table-select signal to '0', corresponding to sub-table=0, and when one processes the chroma plane, one can set the sub-table-select signal to '1'.

2. If one is processing an algorithm which involves 4 luma-only camera inputs in parallel, only one camera input can generally go through the noise filter at a time. Each of these camera inputs may have different noise characteristics, so they need different 2D LUT configurations. Without a disclosed sub-table-select signal, one would need to reprogram the 2D LUT in between each image. For a video feed, that means 4 times (one for each camera) per timestamp from the cameras. Since reprogramming the 2D LUT takes a significant amount of time, it is better to use a disclosed configuration where one programs both of the 2D LUTs as 4 sub-tables. This way, one processes the first camera input, one simply programs the sub-table-select signal to '0', corresponding to sub-table=0, and when one processes the next camera input, one sets the sub-table-select signal to '1' . . . and so forth for sub-table 3, and sub-table 4.

The multiply/accumulate block 112 performs digital filtering by multiplying each pixel in the neighborhood by a corresponding 2D filter weight selected by the weight lookup block 111, and adding all the results together. The accumulate block 113 calculates the sum of the selected 2D weights to be used as the index of the reciprocal lookup table shown as 1/x LUT 125 for efficient LUT based division for normalization.

The division block 115 is shown having inputs coupled to an output of the multiply accumulate block 112, an output of the accumulate block 113, and to the 1/x LUT 125. The division block 115 is shown including a 1/x LUT lookup block 116 and a multiply block 117 which is shown generating the filtered output pixel 121 which reflects a normalized noise filtered range value for the center pixel value. The 1/x LUT lookup block 116 is a reciprocal value lookup, with the lookup based on a total sum of all weights as an index that selects a value from the 1/x LUT 125 for division to implement normalization. The multiply block 117 then implements an efficient way to (Filter Output)/(sum of weights) division after the 1/x LUT lookup block 116 multiplies the output of the filter by the 1/x LUT 125's result selected by the 1/x LUT lookup block 116.

Figure 2A:
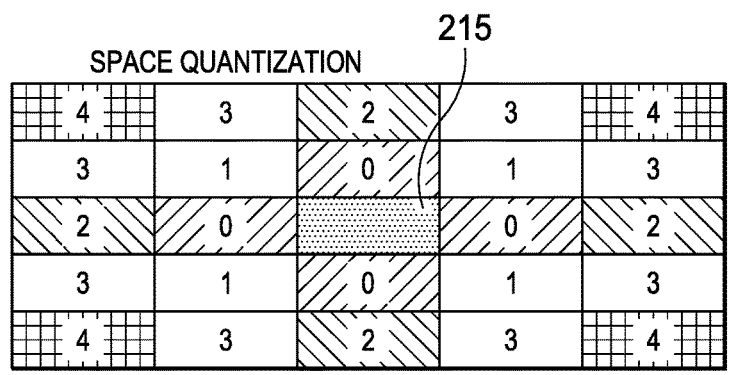
FIGS. 2A and 2B depict example 2D weight computation details, according to example embodiments.
Figure 2B:
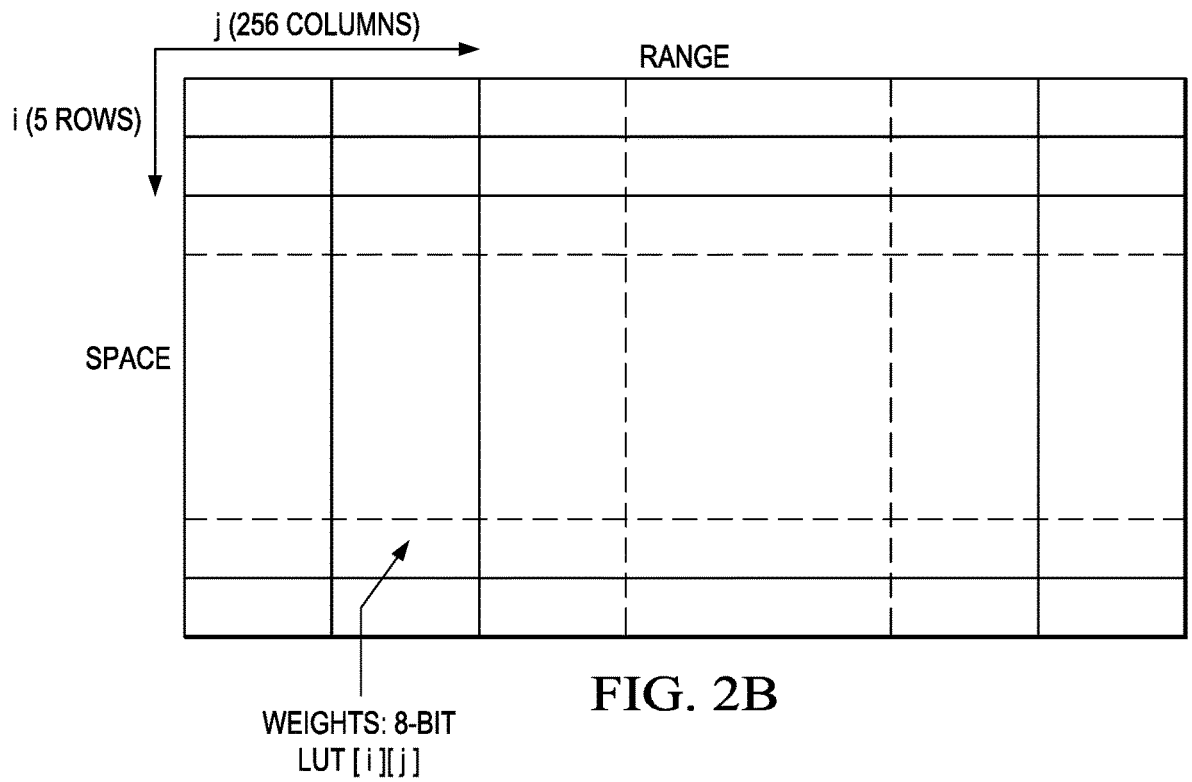

FIGS. 2A and 2B depict example weight computation details utilizing quantization that reduces the number of LUT entries and thus the needed 2D weight LUT size. FIG. 2A shows example space (i.e. distance) quantization by a factor of 5. Although there is a 5×5 filter window being used and thus 24 other (neighboring) pixels, it is recognized there are only 5 different pixel positions (distances) relative to the center pixel 215 as shown. In this example, the number of pixels at distance 0=4, the number of pixels at distance 1=4, the number of pixels at distance 2=4, the number of pixels at distance 3=8, and the number of pixels at distance 4=4.

Linear interpolation can be used to quantize the range (i.e. intensity) values analogous to the space quantization described relative to FIG. 2A. For example, in this example 12 bit pixel range (intensity) values (0 to 4,095) can be reduced to 256 (8 bits), thus by a factor of 16×, such as by linear interpolation. Alternatively, non-linear interpolation can be used to quantize the range by utilizing a non-linear (NL) LUT. The NL LUT has a finer step size at lower range/intensities compared to a step size at higher range/intensities. A finer step size corresponds to more closely spaced data in the LUT at lower intensities compared to a step size (corresponding to closer spaced data in the LUT) at higher intensities. For example, a NL LUT can maintain higher precision (e.g., step size=32) in the generally more important lower intensity interval and a higher step size, say 2 k, in the higher (less sensitive) intensity interval.

FIG. 2B shows the dimensions of an example quantized 2D weight LUT defined within the intersection of the dashed lines shown compared to the size of the outer full resolution 2D LUT, where i is for space (distance) and j is for the range (intensity). (i-j) is 3-bits for an example 5×5 filter window. (Ii–Ij) is 13-bits, which is quantized to 8 bits. $W_{i,j}$ (combined 2D weights) are pre-computed as 8-bit values including normalization that are stored in at least one 2D LUT, such as 2D LUT 120 shown in FIG. 1. LUT[i][j]: i is 3 bit pixel index, j is 8 bit image range (intensity) diff lookup value is 8 bits. The total storage is 5×256×8 bits=1,280 Bytes, such as using flip flops as the memory elements. Provided in this example is thus about a 80× reduction in 2D weight LUT size (versus full resolution being 25×4, 096=102,400 Bytes) while enabling similar filtered image quality evidenced in image quality evaluated from simulation images generated.

Noise and thus sigma (σ) is recognized to be an essentially linear function of the range (i.e. intensity) as well as the space (distance from central pixel). To address this challenge, multiple sub-tables each covering different levels of at least the range (intensity) within a given table are provided and a given 2D LUT sub-table is dynamically selected based on the average range.

Figure 3A:
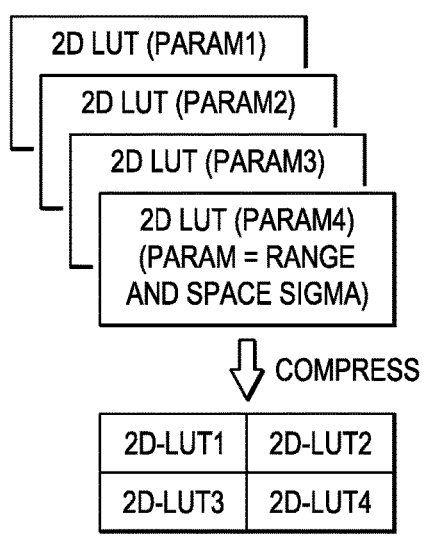
FIGS. 3A-C show example workings of disclosed 2D weight sub-tables, according to example embodiments.
Figures 3B, 3C:
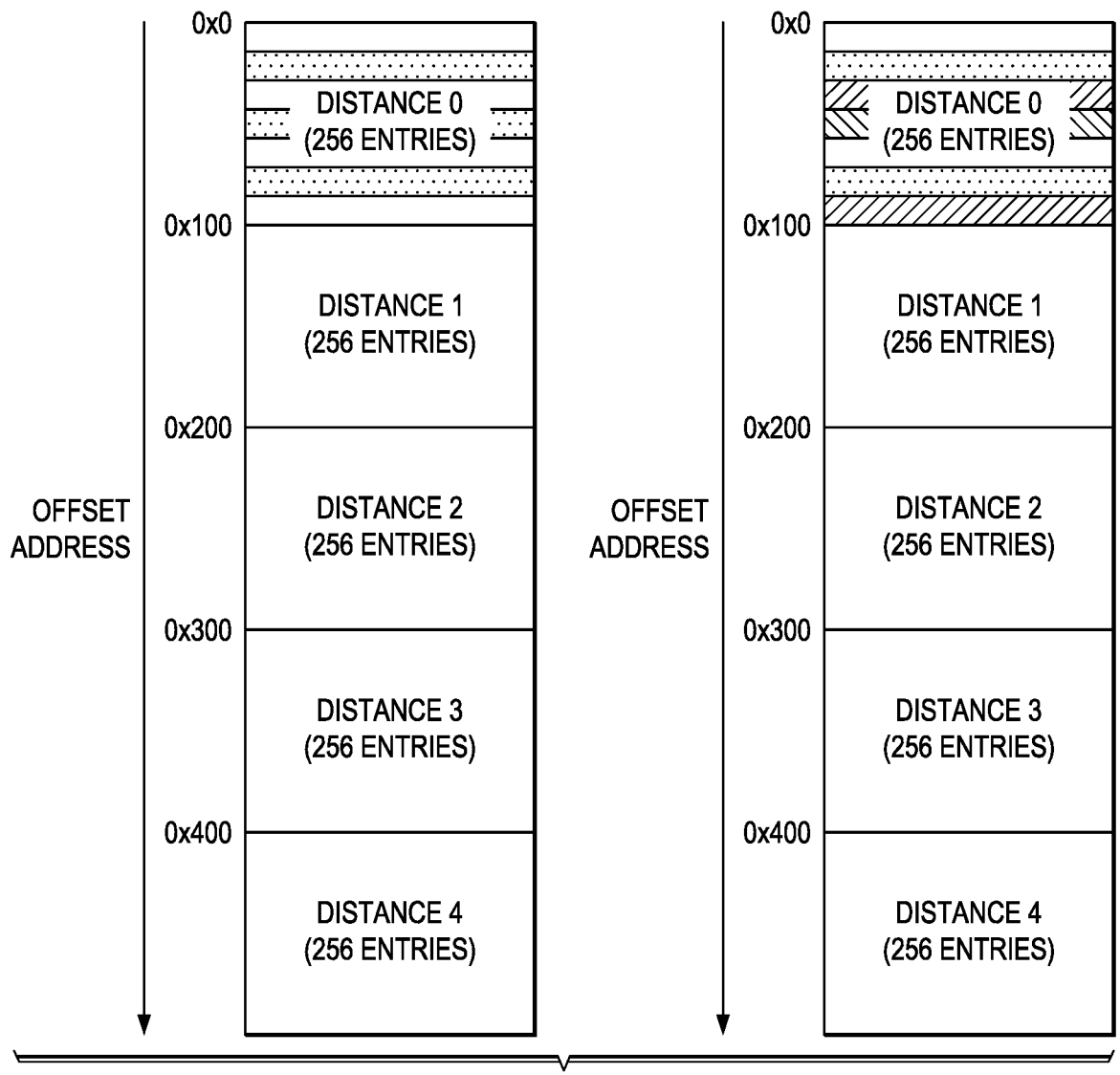

FIGS. 3A-C show workings of disclosed sub-tables by describing an example using 4 disclosed 2D weight LUT sub-tables, where the respective LUT sub-tables each cover different levels of range (and thus different σ values). FIG. 3A shows compression of separate 2D LUTs for parameters 1, 2, 3 and 4 using quantization into the compressed 2D LUT sub-tables shown. Quantization in this example replaces one table of size x, with four tables with size x/4. This means picking every 4$^{th}$ value from the larger table of size x for a given sigma (σ) value. Each parameter as used here as shown in FIG. 3A reflects a range σ and a space σ. The separate 2D LUTs for parameters 1, 2, 3 and 4 after quantization are shown below compressed into a single 2D weight LUT that includes 2D LUT sub-tables shown as 2D-LUT1, 2D-LUT2, 2D-LUT3 and 2D-LUT4 in FIG. 3A.

FIG. 3B shows bilateral mode, num_sub-table=2 and bilateral mode, num_sub-table=4 each having a plurality of space (i.e., distance) entries shown as distance 0 to 4 corresponding to different offset address ranges. FIG. 3B essentially shows multiple sub-table division for various a values (e.g. 2 sub-table configuration on the left side of figures, and 4 sub-table configuration on right side of figure). This example shows that each row takes 256 entries, and the sub-tables are indexed in an interleaved fashion (e.g. table0[0], table1[0], table0[1], table1[1], etc.).

FIG. 3C shows adaption using local 4×4 averaging that can be used for LUT sub-table selection. As an example, this FIG. shows the top left 4×4 pixels from the 5×5 pixel neighborhood surrounding the center pixel. Using a pixel neighborhood which is within the size of the bilateral filter pixel neighborhood has the benefit of already being available within the local memory. Also, choosing a number of pixels to be a power of 2 means that the average can be obtained simply by computing the sum of the pixels, and right shifting instead of dividing (e.g. average of 16 pixels can be given by right shifting the sum by 4). The number of neighborhood pixels chosen, and their distance from the center pixel are not limited to the example given (i.e. the neighborhood pixels can be the full 5×5 filter window, or a size smaller or larger).

Figure 4:
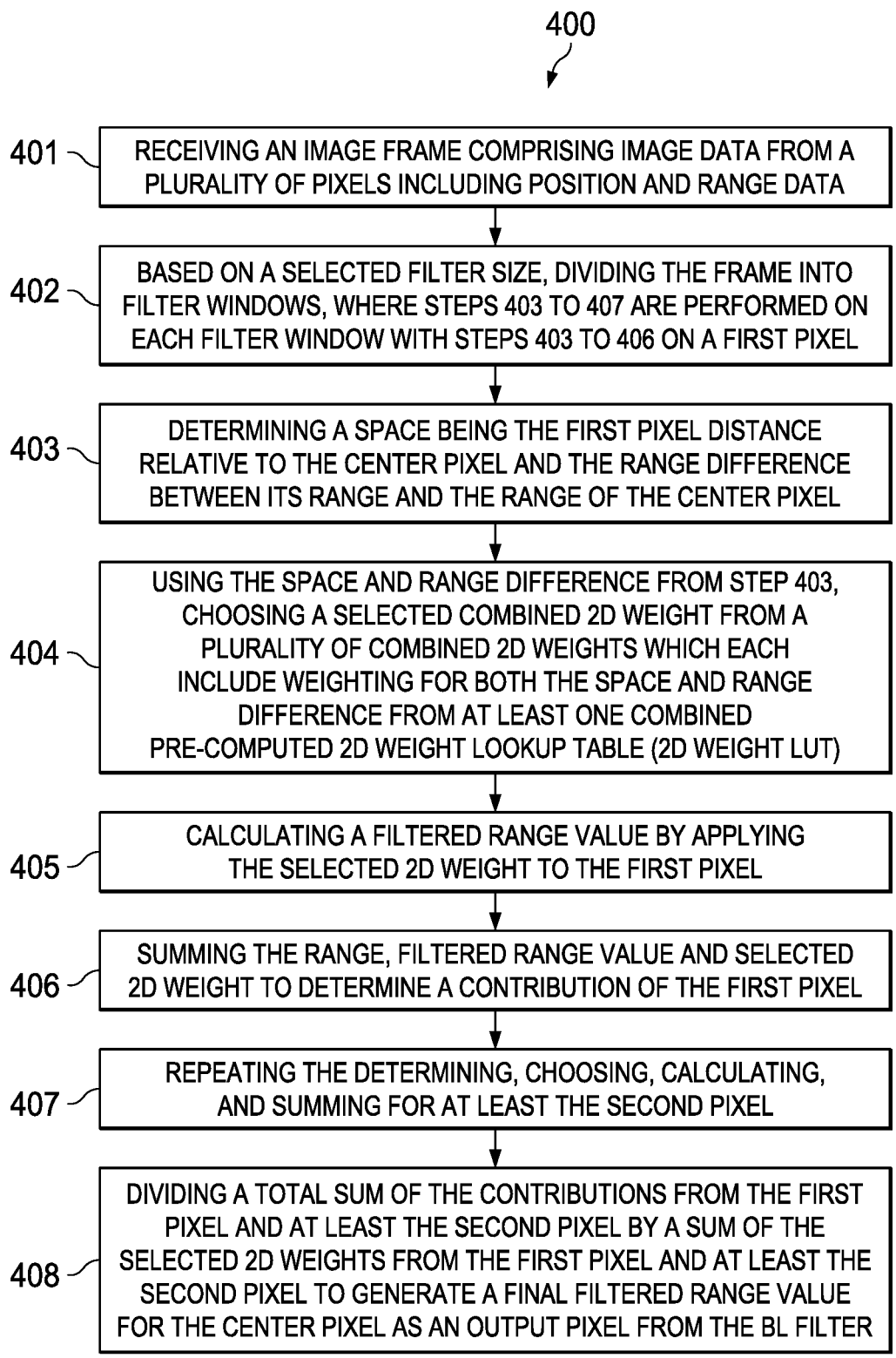
FIG. 4 is a flow chart that shows steps in an example method for BL filtering an image using at least one disclosed combined 2D weight LUT, according to an example embodiment.

FIG. 4 is a flow chart that shows steps in an example method 400 for BL filtering an image using a processor implementing a BL filter algorithm stored in a memory accessible by the processor or using BL filter hardware configured to perform the method utilizing at least one disclosed combined 2D weight LUT, according to an example embodiment. Step 401 comprises receiving an image frame comprising image data from a plurality of pixels including a position and a range.

Step 402 comprises based on a selected filter window size, dividing the frame into a plurality of filter windows each including a center pixel and a plurality of other pixels (or neighborhood pixels) including a first pixel and a second pixel. Step 403 to 407 comprises processing each of the plurality of filter windows including step 403-406 for the first pixel, with step 403 determining a space being the first pixel distance relative to the center pixel and the range difference between its range and the range of the center pixel.

Step 404 comprises using the space and range difference, choosing a selected combined 2D weight (selected 2D weight) from a plurality of combined 2D weights which each include weighting for both the space and range difference from at least one combined pre-computed 2D weight lookup table (2D weight LUT 120), thus being exclusive of any run time weight calculation. Step 405 comprises calculating a filtered range value by applying the selected 2D weight to the first pixel. Step 406 comprises summing the range, filtered range value and selected 2D weight to determine a contribution of the first pixel. Step 407 comprises repeating the determining, choosing, calculating, and summing for at least the second pixel. Step 408 comprises dividing (such as using division block 115 in FIG. 1) a total sum of the contributions from the first pixel and at least the second pixel by a sum of the selected 2D weights from the first pixel and at least the second pixel to generate a final filtered range value for the center pixel as an output pixel 121 from the BL filter. The output pixels from repeating the processing for all of plurality filter windows window can be used to generate a noise filtered image for an ADAS.

For the 2D weight sub-LUT embodiment where the 2D weights provide a plurality of different sigma (σ) values for range, as described above, before choosing the 2D weight, the method can further provide adaptive mode control controlled by a mode signal applied to the weight lookup block 111 for selecting a particular sub-LUT table on a per-pixel basis. In this embodiment, the weight lookup block 111 averages the range of other pixels in each filter window to calculate a local average range for choosing the index for the selecting a sub-LUT. Alternatively, direct mapping to table ID can be controlled by a "sub-table select" signal applied to the weight lookup block 111 for selecting a particular sub-LUT for pixel processing across an entire frame. In this embodiment, the weight lookup block 111 indexes into the sub-LUT specified by the "sub-table-select" signal.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure. For example, disclosed algorithms or HW blocks can also function as an octave scaler for image pyramid generation, as a generic 2D FIR filter, or as a convolution engine. In the case of usage as an octave filter, an octave filter can be realized for example by skipping by 2 (in the horizontal direction) during pixel load, generic filtering (with Gaussian filter coefficients), and skipping by 2 (every line) for pixel storing.

The invention claimed is:

1. A method of filtering noise for imaging, comprising:
using a processor implementing an algorithm stored in a memory accessible by said processor to perform said method on an image frame comprising image data including a position and a range from a plurality of pixels, said frame including a plurality of filter windows each including a center pixel and a plurality of other pixels including a first pixel and a second pixel, processing each of said plurality of filter windows including:
for said first pixel, determining a space being its distance relative to said center pixel and a range difference between its range and said range of said center pixel, using said space and said range difference, selecting a combined 2D weight from a plurality of combined 2D weights which each include weighting for both said space and said range difference from at least one combined pre-computed 2D weight lookup table (2D weight LUT).

2. The method of claim 1, further including calculating a filtered range value by applying said selected combined 2D weight to said first pixel range, and summing said filtered range value to determine a contribution of said first pixel.

3. The method of claim 2, further including repeating said determining, said selecting, said calculating, and said summing for at least said second pixel.

4. The method of claim 3, further including dividing a total sum of said contributions from said first pixel and at least said second pixel by a sum of said selected combined 2D weights from said first pixel and said second pixel to generate a final filtered range value for said center pixel as an output pixel.

5. The method of claim 4, further comprising using said output pixels from said processing said plurality of filter windows to generate a noise filtered image that is utilized for an Advanced Driver Assistance System (ADAS).

6. The method of claim 1, wherein said 2D weight LUT is quantized in at least one of said space and said range.

7. The method of claim 6, wherein said 2D weight LUT is quantized in both said space and said range.

8. The method of claim 6, wherein non-linear interpolation is used to quantize said range by utilizing a non-linear (NL) LUT for said 2D weight LUT including a finer step size at lower values for said range as compared to a larger step size at higher values for said range.

9. The method of claim 1, wherein said memory comprises flip flops or registers.

10. The method of claim 1, wherein said 2D weight LUT comprises a plurality of 2D weight sub-LUTs which each have a plurality of said combined 2D weights providing a plurality of different sigma ($\sigma$) values for said range and for said space, further comprising calculating a sub-table index and using said sub-table index for selecting one of said plurality of 2D weight sub-LUTs (selected 2D weight sub-LUT), and using said selected 2D weight sub-LUT for said processing across all of said plurality of filter windows in said image frame.

11. The method of claim 1, wherein said 2D weight LUT comprises a plurality of 2D weight sub-LUTs which each have a plurality of said combined 2D weights providing a plurality of different sigma ($\sigma$) values for said range, further comprising local averaging in each of said plurality of filter windows to determine an average range and using said average range for selecting one of said plurality of 2D weight sub-LUTs individually for said processing of said plurality of filter windows.

12. The method of claim 11, wherein only a portion of said plurality of other pixels are used to determine said average range.

13. The method of claim 1, wherein said 2D weight LUT comprises a plurality of 2D weight sub-LUTs which each have a plurality of said combined 2D weights providing a plurality of different sigma ($\sigma$) values for at least said range, wherein before said choosing said method further comprises:
based on a pixel image attribute adaptively picking a selected one of said plurality of 2D weight sub-LUTs (selected 2D weight sub-LUT) from said plurality of 2D weight sub-LUTs, and
wherein said choosing said selected 2D weight is from said selected 2D weight sub-LUT.

14. A system for processing images, comprising:
a processor and an associated memory;
a program stored in said memory and executable by said processor, wherein the program implements a method on an image frame comprising image data including a position and a range from a plurality of pixels, said frame including a plurality of filter windows each including a center pixel and a plurality of other pixels including a first pixel and a second pixel, processing each of said plurality of filter windows including:
for said first pixel, determining a space being its distance relative to said center pixel and a range difference between its range and said range of said center pixel, using said space and said range difference, selecting a combined 2D weight from a plurality of combined 2D weights which each include weighting for both said space and said range difference from at least one combined pre-computed 2D weight lookup table (2D weight LUT).

15. The system of claim 14, further including calculating a filtered range value by applying said selected combined 2D weight to said first pixel range, and summing said filtered range value to determine a contribution of said first pixel.

16. The system of claim 15, further including repeating said determining, said selecting, said calculating, and said summing for at least said second pixel.

17. The system of claim 16, further including dividing a total sum of said contributions from said first pixel and at least said second pixel by a sum of said selected combined 2D weights from said first pixel and said second pixel to generate a final filtered range value for said center pixel as an output pixel.

18. The system of claim 17, further comprising using said output pixels from said processing said plurality of filter windows to generate a noise filtered image that is utilized for an Advanced Driver Assistance System (ADAS).

19. The system of claim 14, wherein said 2D weight LUT comprises a plurality of 2D weight sub-LUTs which each have a plurality of said combined 2D weights providing a plurality of different sigma ($\sigma$) values for at least said range, wherein before said choosing said method further comprises:
based on a pixel image attribute adaptively picking a selected one of said plurality of 2D weight sub-LUTs (selected 2D weight sub-LUT) from said plurality of 2D weight sub-LUTs, and
wherein said choosing said selected 2D weight is from said selected 2D weight sub-LUT.

20. The system of claim 14, wherein said 2D weight LUT is quantized in at least one of said space and said range.

21. The system of claim 20, wherein said 2D weight LUT is quantized in both said space and said range.

22. The system of claim 20, wherein non-linear interpolation is used to quantize said range by utilizing a non-linear (NL) LUT for said 2D weight LUT including a finer step size at lower values for said range as compared to a larger step size at higher values for said range.

23. The system of claim 14, wherein said memory comprises flip flops or registers.

24. The system of claim 14, wherein said 2D weight LUT comprises a plurality of 2D weight sub-LUTs which each have a plurality of said combined 2D weights providing a plurality of different sigma ($\sigma$) values for said range and for said space, further comprising calculating a sub-table index and using said sub-table index for selecting one of said plurality of 2D weight sub-LUTs (selected 2D weight sub-LUT), and using said selected 2D weight sub-LUT for said processing across all of said plurality of filter windows in said image frame.

25. The system of claim 14, wherein said 2D weight LUT comprises a plurality of 2D weight sub-LUTs which each have a plurality of said combined 2D weights providing a plurality of different sigma ($\sigma$) values for said range, further comprising local averaging in each of said plurality of filter windows to determine an average range and using said average range for selecting one of said plurality of 2D weight sub-LUTs individually for said processing of said plurality of filter windows.

26. The system of claim 25, wherein only a portion of said plurality of other pixels are used to determine said average range.

\* \* \* \* \*